United States Patent
Oh et al.

(10) Patent No.: US 10,483,527 B2
(45) Date of Patent: Nov. 19, 2019

(54) CATHODE MATERIAL FOR RECHARGEABLE MAGNESIUM BATTERY AND METHOD FOR PREPARING THE SAME

(71) Applicant: KOREA INSTITUTE OF SCIENCE AND TECHNOLOGY, Seoul (KR)

(72) Inventors: Si Hyoung Oh, Seoul (KR); Byung Won Cho, Seoul (KR); Won Young Chang, Seoul (KR); Jung Hoon Ha, Seoul (KR); Boeun Lee, Seoul (KR); Hyo Ree Seo, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/486,201

(22) Filed: Apr. 12, 2017

(65) Prior Publication Data
US 2018/0138502 A1 May 17, 2018

(30) Foreign Application Priority Data
Nov. 17, 2016 (KR) .................. 10-2016-0153213

(51) Int. Cl.
*H01M 10/052* (2010.01)
*H01M 4/36* (2006.01)
(Continued)

(52) U.S. Cl.
CPC ........... *H01M 4/364* (2013.01); *H01M 4/381* (2013.01); *H01M 4/5815* (2013.01);
(Continued)

(58) Field of Classification Search
CPC .................. H01M 10/052; H01M 10/0525
See application file for complete search history.

(56) References Cited

U.S. PATENT DOCUMENTS

2007/0166983 A1* 7/2007 Liu .................. H01L 45/085
438/597
2013/0004830 A1 1/2013 Song et al.

FOREIGN PATENT DOCUMENTS

KR 10-2014-0012332 2/2014

OTHER PUBLICATIONS

Renuka (journal of applied electrochemistry 27 á short communication (Year: 1997).*
(Continued)

*Primary Examiner* — Olatunji A Godo
(74) *Attorney, Agent, or Firm* — Goldilocks Zone IP Law

(57) ABSTRACT

Provided is a cathode material for a rechargeable magnesium battery, represented by the chemical formula of $Ag_2S_xSe_{1-x}$ (0≤x≤1), a highly stable cathode material and a rechargeable magnesium battery including the same. The cathode material for a rechargeable magnesium battery has a higher discharge capacity and higher discharge voltage as compared to a typical commercially available cathode material, Chevrel phase, and shows excellent stability in an electrolyte for a rechargeable magnesium battery including chloride ions. In addition, after evaluating the cycle life of the cathode material, the cathode material shows an excellent discharge capacity per unit weight after 500 charge/discharge cycles, and thus is useful for a cathode material for a rechargeable magnesium battery.

8 Claims, 3 Drawing Sheets

(51) Int. Cl.
*H01M 4/38* (2006.01)
*H01M 4/58* (2010.01)
*H01M 4/62* (2006.01)
*H01M 10/054* (2010.01)
*H01M 10/0568* (2010.01)
*H01M 10/0569* (2010.01)
*H01M 4/02* (2006.01)

(52) U.S. Cl.
CPC ............ *H01M 4/623* (2013.01); *H01M 4/625* (2013.01); *H01M 10/054* (2013.01); *H01M 10/0568* (2013.01); *H01M 10/0569* (2013.01); *H01M 2004/028* (2013.01)

(56) References Cited

OTHER PUBLICATIONS

Takahashi et al. (J. Electrochem. Soc. vol. 117, issue 1, 1-5 (Year: 1970).*
Kashida et al., Electronic structure of Ag2S, band calculation and photoelectron spectroscopy, Sep. 30, 2002, pp. 167-175, Solid State Ionics 158 (2003), Elsevier.
Miller et al. Aftershocks driven by a highpressure CO2 source at depth, letters to nature, Feb. 19, 2004, pp. 724-727, vol. 427.

\* cited by examiner

CATHODE MATERIAL FOR RECHARGEABLE MAGNESIUM BATTERY AND METHOD FOR PREPARING THE SAME

CROSS-REFERENCE TO RELATED APPLICATIONS

This application claims priority under 35 U.S.C. § 119 to Korean Patent Application No. 10-2016-0153213 filed on Nov. 17, 2016 in the Korean Intellectual Property Office, the disclosure of which is incorporated herein by reference in its entirety.

TECHNICAL FIELD

The following disclosure relates to a cathode material for a rechargeable magnesium battery and a method for preparing the same.

BACKGROUND

Li-ion batteries have been adopted to date mainly as power sources for compact electronic instruments. Recently, the market of Li-ion batteries have been enlarged, and they have been considered as power sources for electric vehicles and medium- and large-scale commercial energy storage systems (ESS). However, in the case of medium- and large-scale rechargeable battery systems, safety and cost efficiency thereof are more important as compared to electrochemical performance thereof. In this context, Li-ion batteries have a certain limitation. Thus, there has been an increasing need for developing a rechargeable battery satisfying the above requirements.

As one of the plausible candidates satisfying the above requirements, a rechargeable magnesium battery which uses magnesium metal as a high-capacity capacity and high-safety anode material, while magnesium ions repeat reversible insertion and extraction into/from a cathode, has been paid increased attentions recently. Magnesium is much more cost-efficient, shows lower chemical activity than lithium, and furthermore, does not form any dendritic structure during the electrochemical deposition and dissolution process leading to an excellent safety. In addition, a rechargeable magnesium battery uses a metal directly as an anode, and thus has a significantly high capacity density per weight and volume corresponding to 2205 Ah/kg and 3833 Ah/L, respectively. Thus, magnesium is advantageous in various aspects.

However, in order to develop practical rechargeable magnesium batteries, it is still required to develop an electrolyte having a wide electrochemical potential window compatible with both a magnesium anode and a high-potential cathode material, and a high-potential and high-capacity cathode material which allows a reversible electrode reaction with magnesium ions. A typical magnesium cathode material developed to date, $Mo_6S_8$ Chevrel phase, has an energy density per weight just of 128 mAh/g, which is significantly lower as compared to the conventional cathode materials for a Li-ion battery. Moreover, it has a working voltage of about 1.2 V. Therefore, there is an imminent need for developing a novel cathode material.

However, most of electrolytes currently developed for a rechargeable magnesium battery have both high nucleophilicity and strong corrosive property derived from the incorporation of a high concentration of chloride ions ($Cl^-$). Thus, it causes a side reaction with the conventional cathode materials (metal oxide ($MO_x$), sulfur (S), selenium (Se) compounds) with ease, resulting in some disadvantages, including significant degradation of cycle characteristics or a limited potential window due to the decomposition of an electrolyte.

Under these circumstances, in order to develop high-capacity rechargeable magnesium batteries, it is required to develop a cathode material for a magnesium battery, which is stable chemically in the presence of such an electrolyte containing chloride ions, has strong anti-corrosive property capable of resisting the attack of chloride ions to overcome the above-mentioned limitation, shows higher capacity as compared to the conventional batteries, and provides cycle stability.

REFERENCES

Patent Document

1. U.S. patent application Ser. No. 13/484,827

Non-Patent Document

1. D. Aurbach et al., Nature, 427 (2000) 724-727

SUMMARY

An embodiment of the present disclosure is directed to providing a cathode active material for a rechargeable magnesium battery, which has excellent cycle life and high capacity.

Another embodiment of the present disclosure is directed to providing a high-capacity rechargeable magnesium battery and a high-capacity hybrid magnesium battery, which include a cathode material for a rechargeable magnesium battery having a long cycle life and high capacity.

In one aspect, there is provided a cathode material for a rechargeable magnesium battery, represented by the following Chemical Formula 1:

  [Chemical Formula 1]

$$Ag_2S_xSe_{1-x}$$ [Chemical Formula 1]

wherein x is a real number satisfying 0≤x≤1.

In another aspect, there is provided a cathode for a rechargeable magnesium battery, which includes the cathode material for a rechargeable magnesium battery according to some embodiments of the present disclosure.

In still another aspect, there is provided a rechargeable magnesium battery including the cathode for a rechargeable magnesium battery according to some embodiments of the present disclosure.

There is also provided a hybrid secondary battery using a magnesium salt and a lithium salt at the same time.

In yet another aspect, there is provided an electrochemical product including the rechargeable magnesium battery according to some embodiments of the present disclosure.

The cathode material for a rechargeable magnesium battery disclosed herein has a higher capacity as compared to a typical conventional cathode material, molybdenum sulfide ($Mo_6S_8$), shows excellent electrochemical stability and cycle life in an electrolyte solution containing Grignard reagent and chloride ions, causes no side reaction with an electrolyte to provide high-efficiency during charge/discharge cycles. Thus, the cathode material disclosed herein is useful for a cathode material for a high-capacity rechargeable magnesium battery and hybrid magnesium battery. The cathode material disclosed herein shows higher capacity and higher output characteristics as compared to the conventional cathode material for a rechargeable magnesium battery. Particularly, it is shown that the cathode material disclosed herein shows a smaller fading in discharge capacity per unit weight after 500 measurements and thus has excellent life characteristics.

DETAILED DESCRIPTION OF EMBODIMENTS

Figure 1:
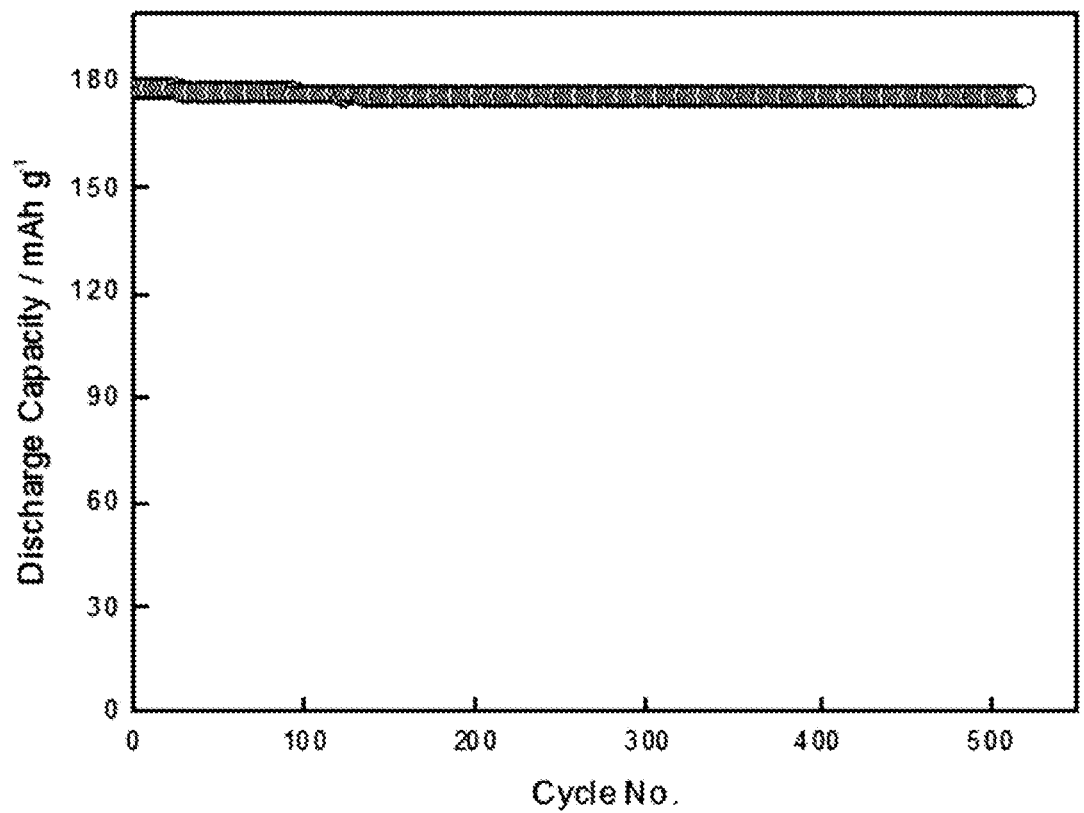
FIG. 1 is a graph illustrating the cycle characteristics and capacity of a rechargeable magnesium battery using silver selenide ($Ag_2Se$) as a cathode material.

Hereinafter, various aspects and embodiments of the present disclosure will be explained in more detail.

In one aspect, there is provided a cathode material for a rechargeable magnesium battery, represented by the following Chemical Formula 1. The cathode material allows a reversible electrochemical reaction with magnesium ions:

$Ag_2S_xSe_{1-x}$  [Chemical Formula 1]

wherein x is a real number satisfying $0 \leq x \leq 1$.

According to an embodiment, when x is 1, $Ag_2S$ includes a monoclinic system ($\beta$-$Ag_2S$) crystal structure, body-centered cubic system ($\alpha$-$Ag_2S$) crystal structure, face-centered cubic system ($\gamma$-$Ag_2S$) crystal structure and an amorphous structure.

According to another embodiment, when x is 0, $Ag_2Se$ includes an orthorhombic system ($\beta$-$Ag_2Se$) crystal structure, cubic system ($\alpha$-$Ag_2Se$) crystal structure, and an amorphous structure.

According to still another embodiment, when x satisfies $0<x<1$, $Ag_2S_xSe_{1-x}$ includes a solid solution of $Ag_2S$ and $Ag_2Se$.

According to yet another embodiment, the molar ratio of $Ag_2S:Ag_2Se$ may be 1:5-0.5, but is not limited thereto.

In another aspect, there is provided a cathode for a rechargeable magnesium battery, which includes the cathode material for a rechargeable magnesium battery disclosed herein.

According to an embodiment, the cathode for a rechargeable magnesium battery may include a nanocomposite of the cathode material for a rechargeable magnesium battery disclosed herein with carbon black.

According to another embodiment, the weight ratio of the cathode material for a rechargeable magnesium battery to carbon black contained in the composite may be 99-0.5:1.

The cathode may further include a conductive material or binder, in addition to the cathode material for a rechargeable magnesium battery disclosed herein.

In still another aspect, there is provided a rechargeable magnesium battery including the cathode for a rechargeable magnesium battery disclosed herein.

The rechargeable magnesium battery also includes an anode, wherein the anode may be a magnesium single material or magnesium-containing alloy.

According to an embodiment, the rechargeable magnesium battery further includes an electrolyte containing both a lithium salt and a magnesium salt. In this manner, it is possible to provide a hybrid secondary battery using both a magnesium salt and a lithium salt.

According to another embodiment, the rechargeable magnesium battery may include a non-aqueous electrolyte containing magnesium ions and chloride ions in an ether solvent.

Typical examples of the non-aqueous electrolyte for the rechargeable magnesium battery may include a dichloro-complex (DCC) electrolyte including $Mg(AlCl_2EtBu)_2$ salt, all phenyl complex (APC) electrolyte including $Mg_2Cl_3^+$—$AlPh_2Cl_2^-$ salt, magnesium-aluminum chloride complex (MACC) electrolyte including $Mg_2Cl_3 \cdot 6THF^+$—$AlCl_4^-$ salt, or the like. In the above chemical formulae, ($Mg(AlCl_2EtBu)_2$) and ($Mg_2Cl_3^+$—$AlPh_2Cl_2^-$), Et represents ethyl, Bu represents butyl, and Ph represents phenyl.

The cathode material for a rechargeable magnesium battery induces an intercalation/deintercalation reaction or conversion reaction of magnesium ions at a cathode upon discharge to form magnesium selenide (MgSe) or magnesium sulfide (MgS), while inducing the reverse reaction during charge so that it may be returned to its original state.

Cathode Reaction Upon Discharge $Ag_2Se(s)+Mg^{2+}+2e^- \rightarrow MgSe(s)+2Ag(s)$ 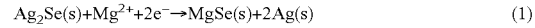 (1)

$Ag_2S(s)+Mg^{2+}+2e^- \rightarrow MgS(s)+2Ag(s)$ 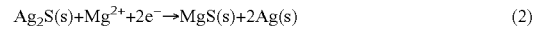 (2)

$Ag_2S_xSe_{1-x}(s)+2Mg^{2+}+2e^- \rightarrow Mg_2S_xSe_{1x}(s)+2Ag(s)$ 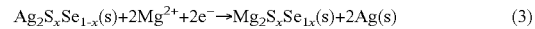 (3)

Cathode Reaction Upon Charge $MgSe(s)+2Ag(s) \rightarrow Ag_2Se(s)+Mg^{2+}+2e^-$ 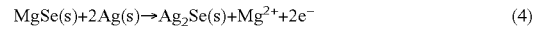 (4)

$MgS(s)+2Ag(s) \rightarrow Ag_2S(s)+Mg^{2+}+2e^-$ 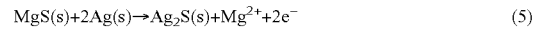 (5)

$Mg_2S_xSe_{1-x}(s)+2Ag(s) \rightarrow Ag_2S_xSe_{1-x}(s)+2Mg^{2+}+2e^-$ 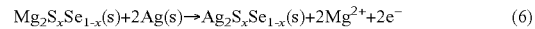 (6)

In still another aspect, there is provided an electrochemical product including the rechargeable magnesium battery disclosed herein.

According to an embodiment, the electrochemical product may be selected from an electric vehicle, hybrid electric vehicle, energy storage system and a power supply system for emergency.

In yet another aspect, there is provided a method for preparing a cathode material for a rechargeable magnesium battery, represented by the following Chemical Formula 1, the method including: (A) mixing $Ag_2Se$ with $Ag_2S$, subjecting the resultant mixture to ball milling under inert gas atmosphere, and carrying out heat treatment under inert gas atmosphere. Herein, the heat treatment may be omitted.

$Ag_2S_xSe_{1-x}$  [Chemical Formula 1]

wherein x is a real number satisfying $0 \leq x \leq 1$, and the cathode material for a rechargeable magnesium battery represented by Chemical Formula 1 includes a solid solution of $Ag_2S$ and $Ag_2Se$.

According to an embodiment, the inert gas may be argon, the ball milling may be high-energy ball milling, and the heat treatment may be carried out at 400-900° C. for 12-72 hours.

Exemplary embodiments now will be described more fully hereinafter with reference to Examples and Test Example. The present disclosure may, however, be embodied in many different forms and should not be construed as limited to the exemplary embodiments set forth therein. While the present disclosure has been described with respect to the specific embodiments, it will be apparent to those skilled in the art that various changes and modifications may be made without departing from the spirit and scope of the disclosure as defined in the following claims.

In addition, the following test results are typical test results of Examples and Comparative Examples. Each of the effects of various embodiments not specified hereinafter will be described particularly at the corresponding part.

EXAMPLES

Example 1: Preparation of Cathode Material and Preparation of Cathode Material/Carbon Black Nanocomposite Among the materials represented by the above Chemical Formula 1, $Ag_2Se$ and $Ag_2S$ may be purchased commercially from general chemical production companies (Sigma-Aldrich, etc.) in the form of a bulk reagent having a purity of 99% or higher. In the case of a solid solution $Ag_2S_xSe_{1-x}$, three different samples are prepared. After thoroughly mixing $Ag_2Se$ with $Ag_2S$ at a molar ratio of 1:0.25, 1:0.5 or 1:1, the resultant mixture is subjected to high-energy ball milling in argon gas atmosphere for 10 hours, and then subjected to heat treatment under inert atmosphere at 500° C. for 24 hours. To obtain a nanocomposite of each cathode material with carbon having a large specific surface area, each of bulk type $Ag_2Se$, $Ag_2S$ and $Ag_2S_xSe_{1-x}$ is mixed with carbon black (Denka black) at a weight ratio of 1:1. Next, the resultant mixture is introduced to a zirconia bowl together with zirconia balls and high-energy ball milling is carried out for 10 hours under argon gas atmosphere.

Example 2: Production of Cathode

The cathode material-carbon black nanocomposite obtained from Example 1 is mixed with a binder, polyvinylidene fluoride (PVdF), at a weight ratio of 90:10, and the resultant mixture is dispersed into N-methyl-2-pyrrolidone (NMP) to form slurry. Then, the slurry is coated uniformly onto molybdenum (Mo) foil having a thickness of 25 µm, followed by drying. In this manner, a cathode is provided.

Example 3: Production of Magnesium Secondary Battery

A coin type magnesium secondary battery is obtained by using each cathode obtained from Example 2, an anode of magnesium foil, an electrolyte and a separator. The separator used herein is glass fiber having a thickness of 100 µm. The electrolyte used herein is 0.2 M $Mg_2Cl_3^+$—$AlPh_2Cl_2^-$ dissolved in tetrahydrofuran (THF). An electrolyte for a hybrid secondary battery is obtained by adding a lithium salt (LiCl, LiTFSi, etc.) to the electrolyte.

TEST EXAMPLE: EVALUATION FOR QUALITY OF BATTERY

Figure 2:
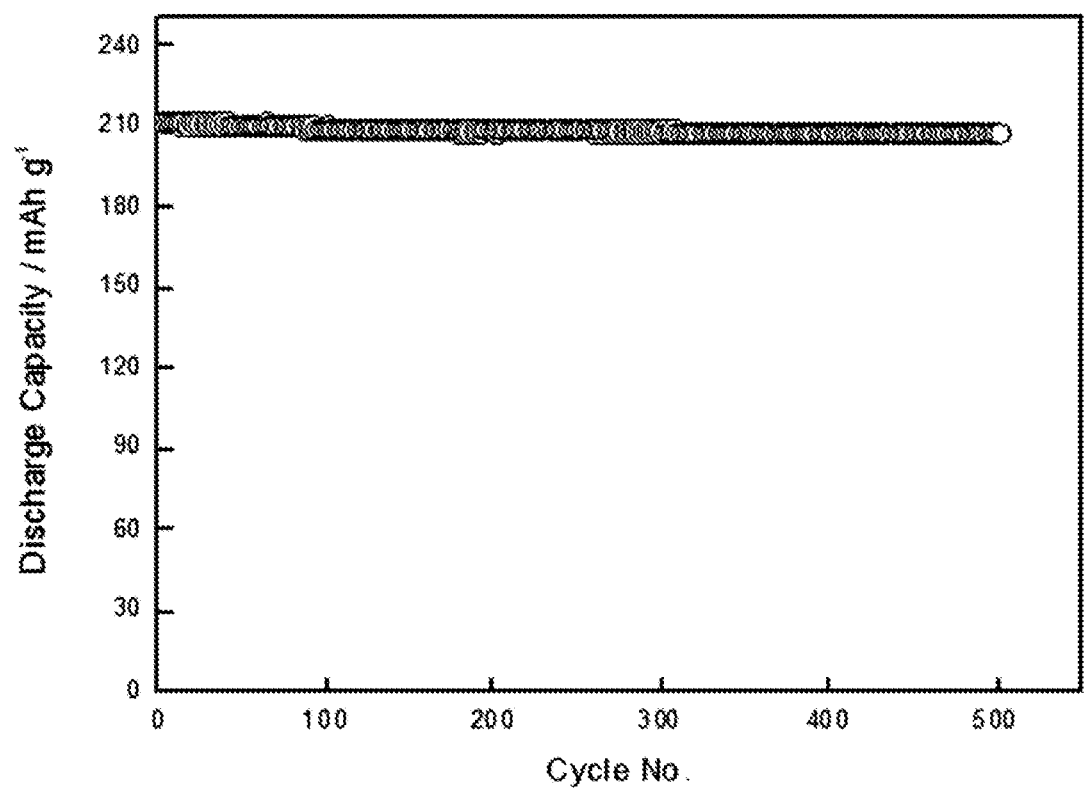
FIG. 2 is a graph illustrating the cycle characteristics and capacity of a rechargeable magnesium battery using silver sulfide ($Ag_2S$) as a cathode material.
Figure 3:
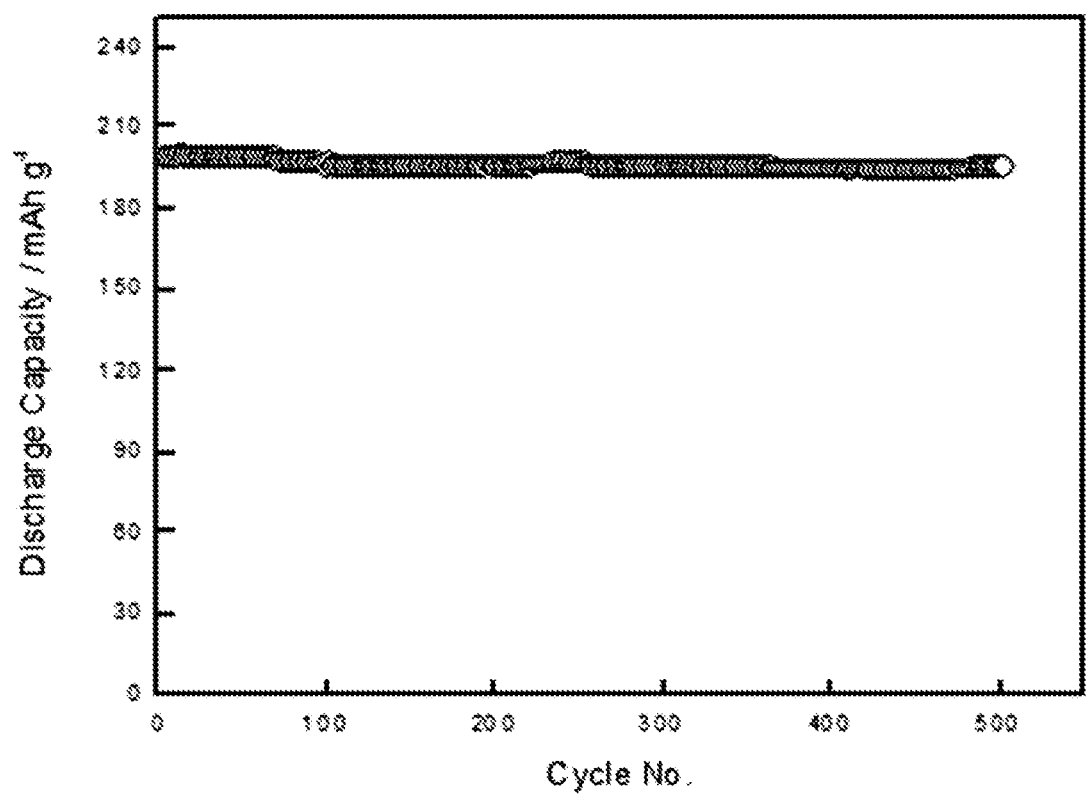
FIG. 3 is a graph illustrating the cycle characteristics and capacity of a rechargeable magnesium battery using a silver sulfide-selenide ($Ag_2S_xSe_{1-x}$) solid solution compound as a cathode material.

Each battery obtained as described above is evaluated for charge/discharge life characteristics in a constant-current mode. The results are shown in FIG. 1, FIG. 2 and FIG. 3. Herein, the current density is 20 µA/cm$^2$ and the voltage ranges from 0.4 V to 2.0 V.

What is claimed is:

1. A cathode material for a rechargeable magnesium battery, represented by the following Chemical Formula 1:

$$Ag_2SxSe_{1-x} \qquad \text{[Chemical Formula 1]}$$

wherein x is a real number and satisfies 0<x<1, $Ag_2SxSe_{1-x}$ comprises a solid solution of $Ag_2S$ and $Ag_2Se$.

2. A cathode for a rechargeable magnesium battery, which comprises the cathode material for a rechargeable magnesium battery as defined in claim 1.

3. A cathode for a rechargeable magnesium battery, which comprises a nanocomposite of the cathode material for a rechargeable magnesium battery as defined in claim 1 with carbon black.

4. The cathode for a rechargeable magnesium battery according to claim 3, wherein the weight ratio of the cathode material for a rechargeable magnesium battery to carbon black contained in the composite is 99-0.5:1.

5. A rechargeable magnesium battery comprising the cathode for a rechargeable magnesium battery as defined in claim 3.

6. The rechargeable magnesium battery according to claim 5, which further comprises an electrolyte containing both a lithium salt and a magnesium salt.

7. An electrochemical product comprising the rechargeable magnesium battery as defined in claim 6, which is selected from an electric vehicle, hybrid electric vehicle, energy storage system and a power supply system for emergency.

8. A rechargeable magnesium battery comprising the cathode for a rechargeable magnesium battery as defined in claim 4.

* * * * *